Aug. 12, 1947.  F. R. SCHMITT  2,425,347
APPARATUS FOR TESTING AND CLASSIFYING INSULATING
SHEETS ACCORDING TO DIELECTRIC STRENGTH
Filed Oct. 7, 1942  6 Sheets-Sheet 6
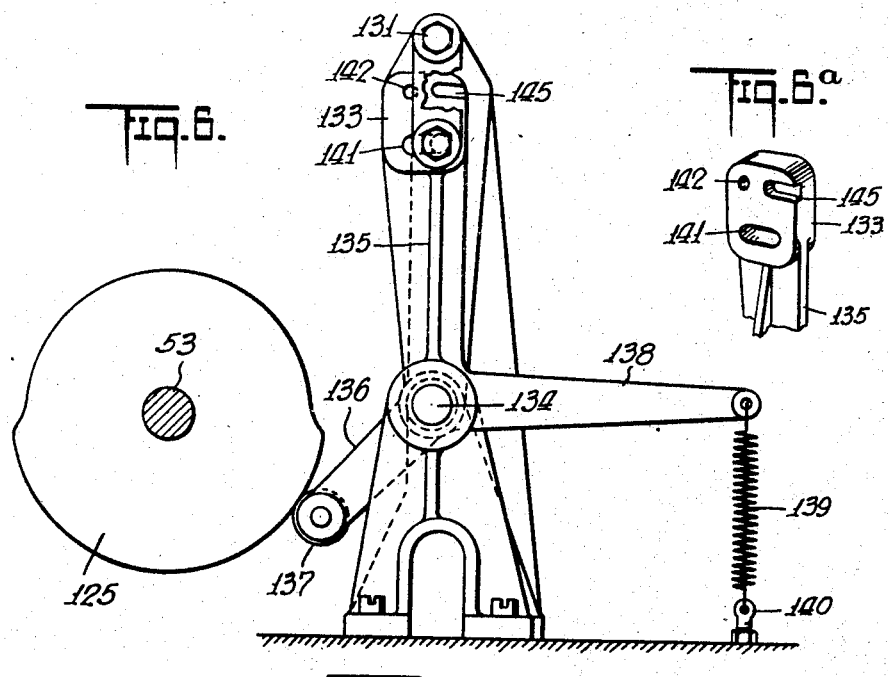
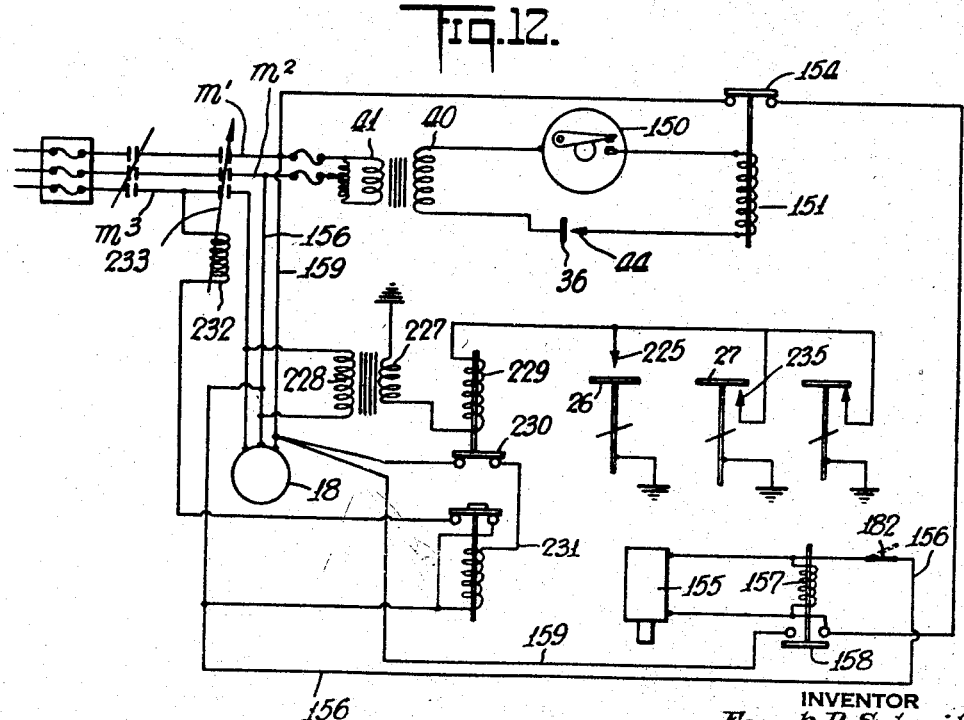
INVENTOR
Frank R. Schmitt
BY
Dean Fairbank & Hirsel
ATTORNEYS Patented Aug. 12, 1947

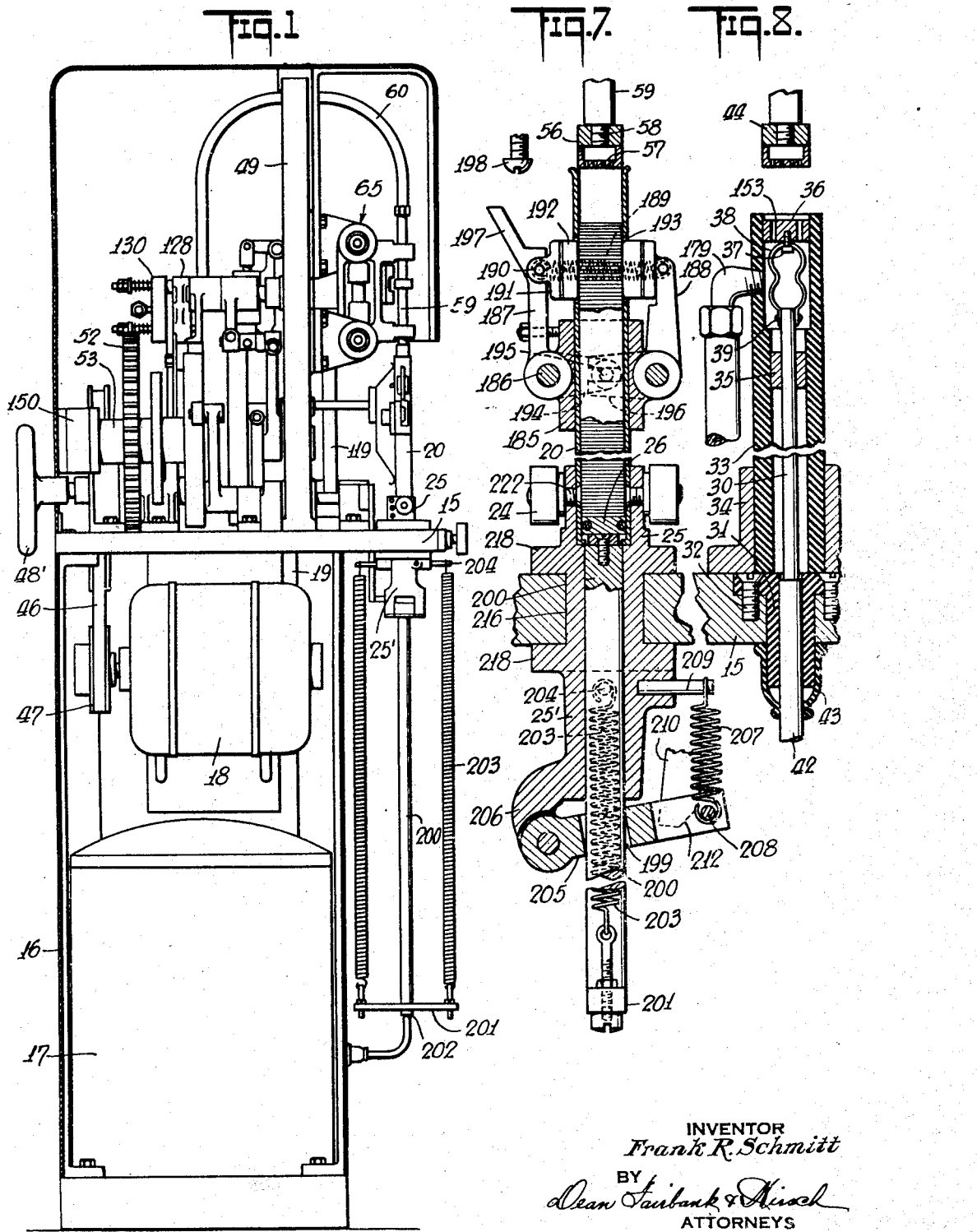

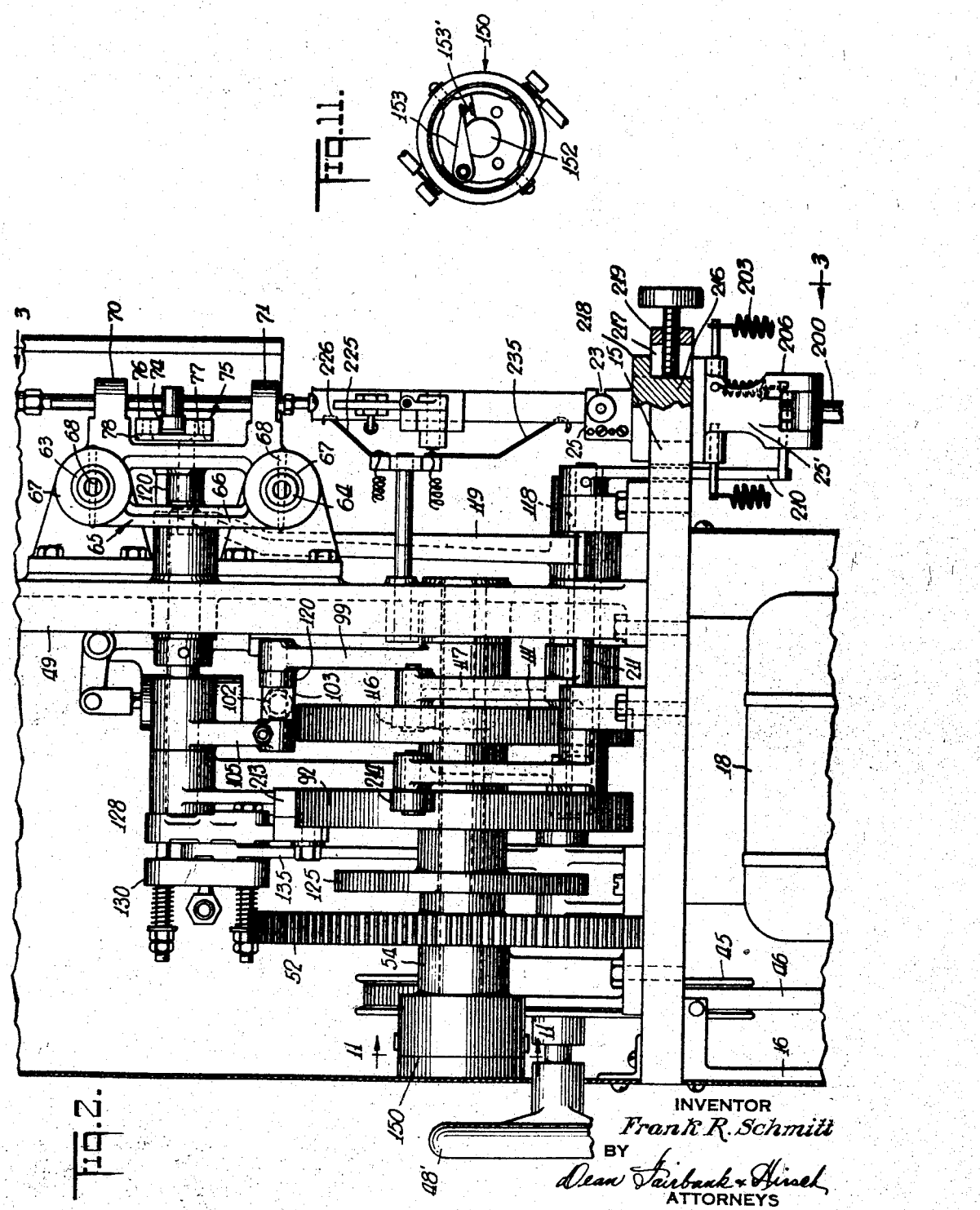

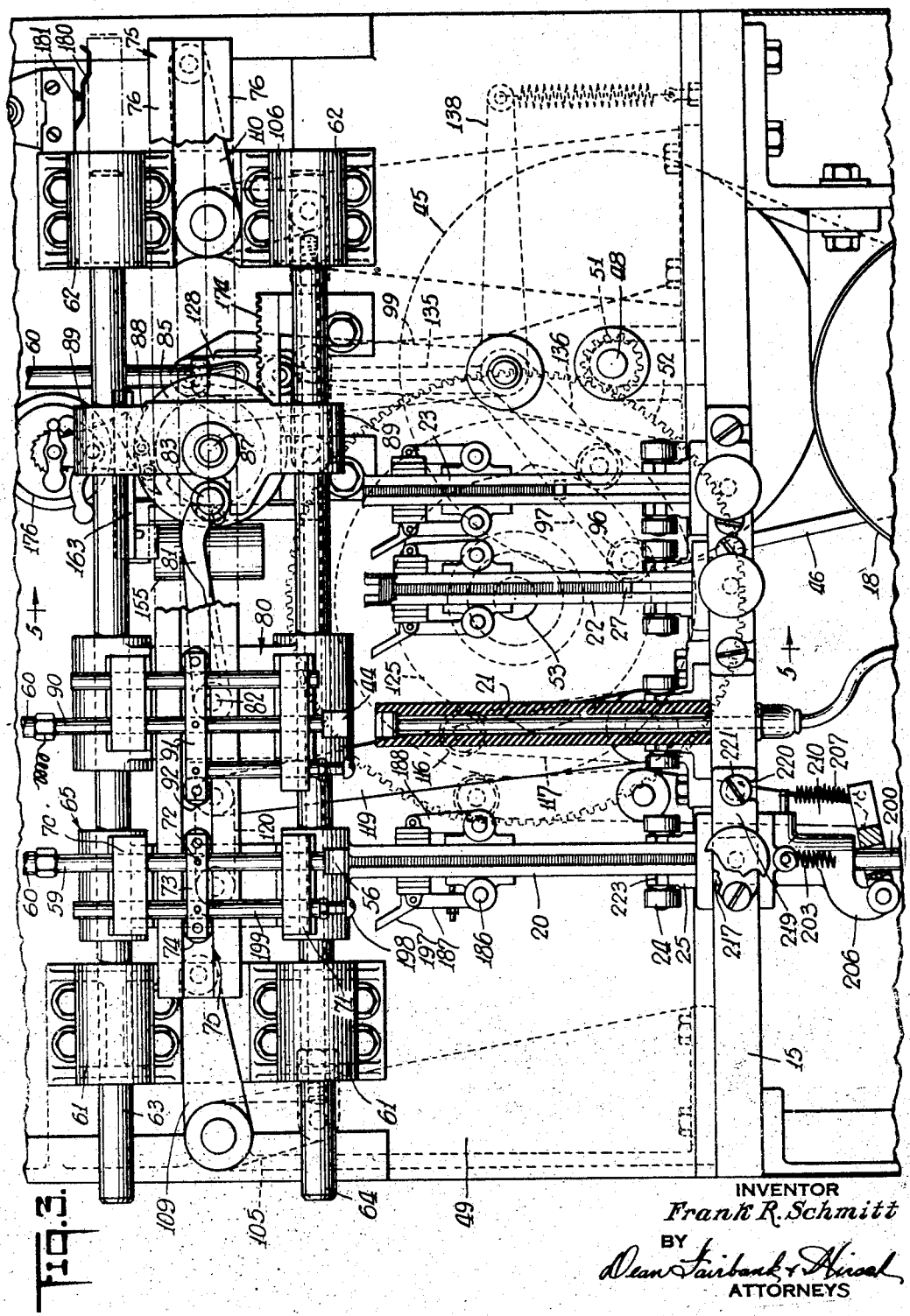

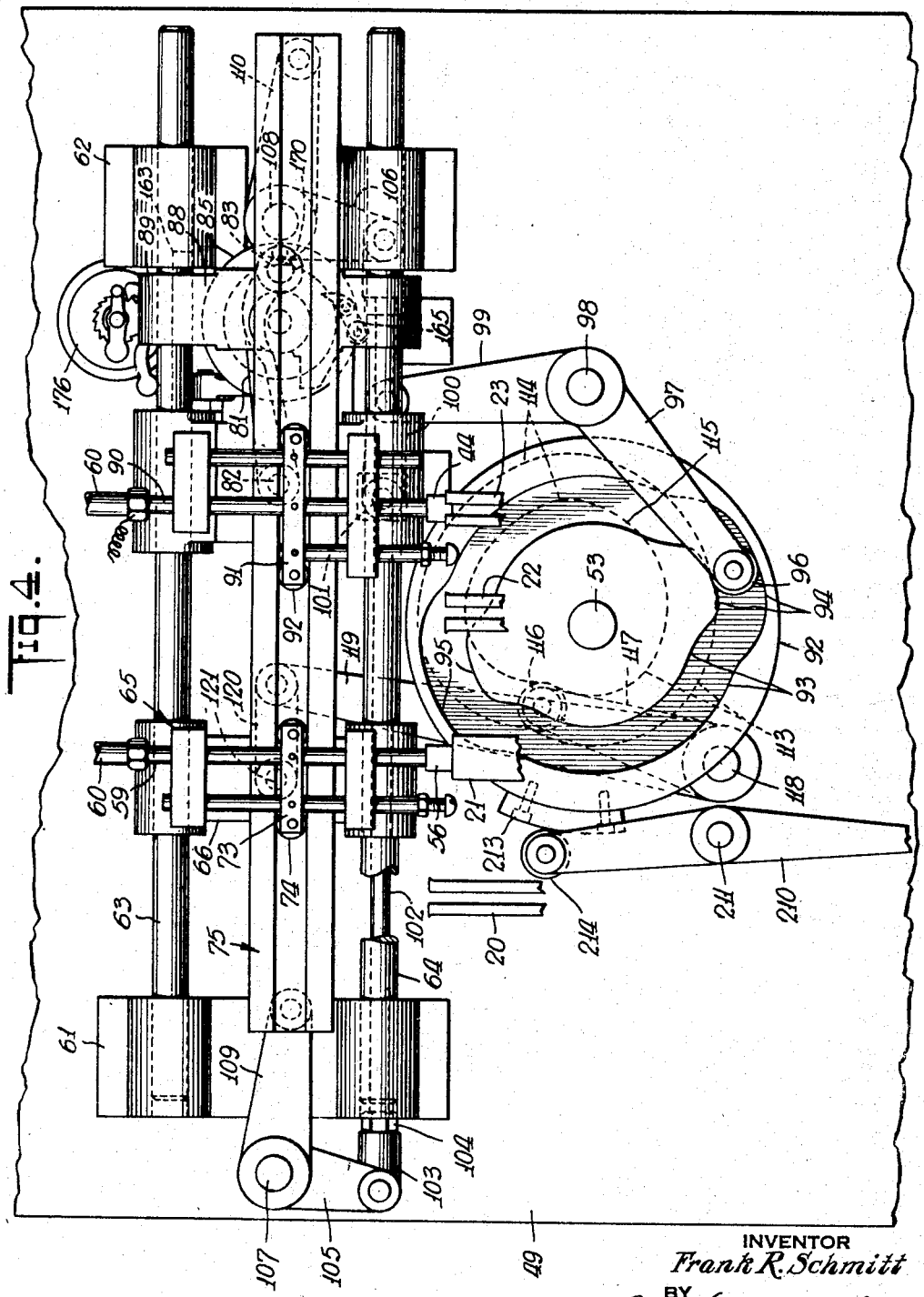

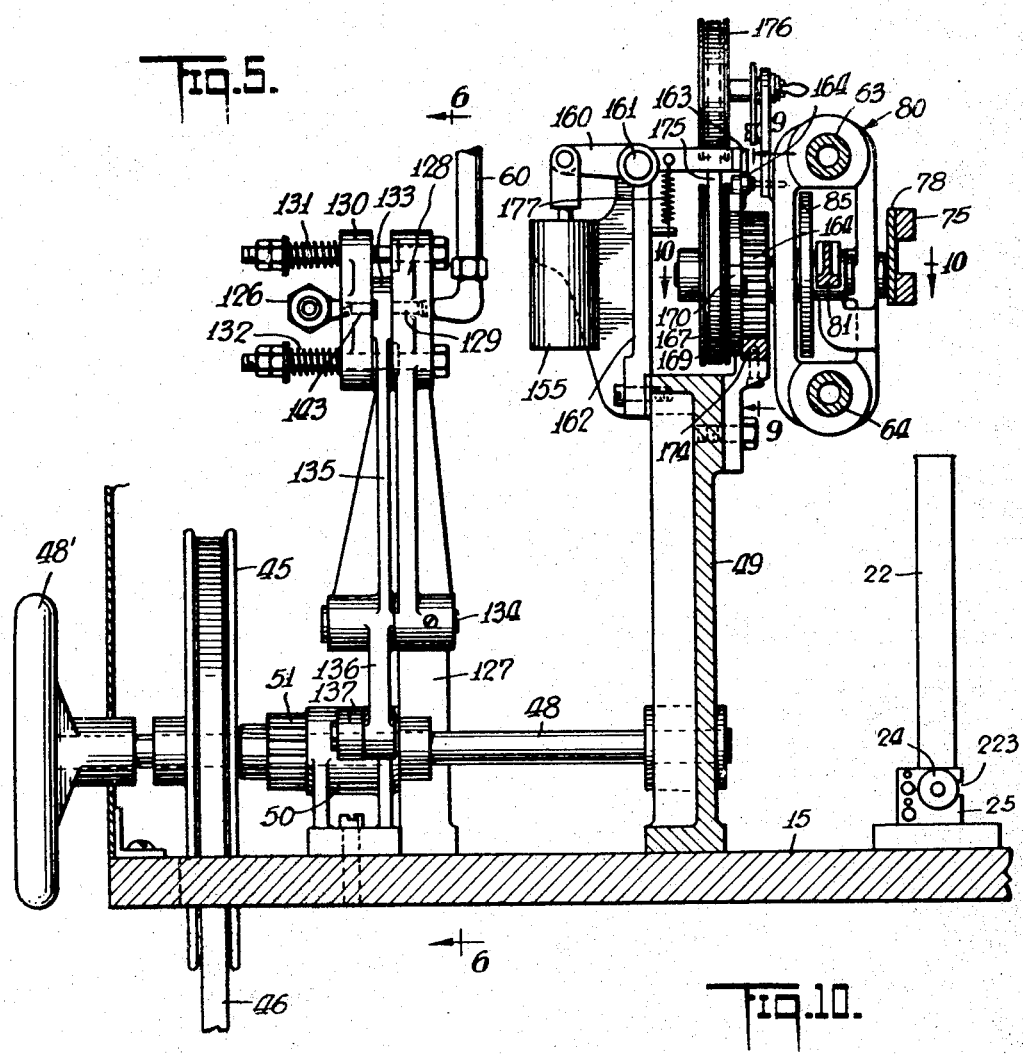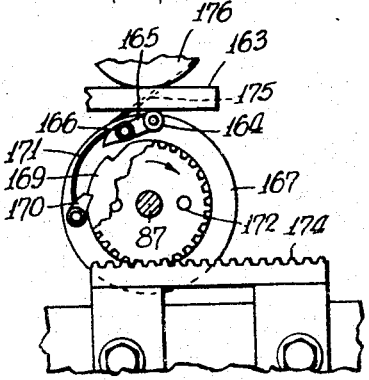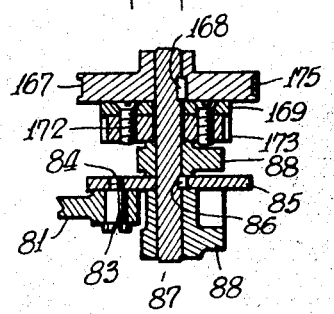

2,425,347

UNITED STATES PATENT OFFICE 2,425,347

APPARATUS FOR TESTING AND CLASSIFYING INSULATING SHEETS ACCORDING TO DIELECTRIC STRENGTH

Frank R. Schmitt, New York, N. Y., assignor, by mesne assignments, to Aerovox Corporation, New Bedford, Mass., a corporation of Massachusetts Application October 7, 1942, Serial No. 461,238

32 Claims. (Cl. 209—81)

The present invention is concerned with the classification of insulating sheets, especially of the mica sheets used as dielectric in electrostatic condensers.

Since the culling of mica sheets for condenser dielectric use by visual inspection is a costly operation which is not uniformly reliable in that it frequently fails to disclose latent defects that become evident only after assembly, and sometimes after installation of the condenser, it is a fundamental object of the invention to provide an automatic machine for testing sheets of mica, or the like, automatically and speedily to classify them according to their dielectric efficacy and with absolute dependability to segregate the good sheets or those that meet specifications from the bad ones, or those that are below specifications, so that no latent defects will develop in condensers built from the selected mica or other dielectric sheets, and tremendous economy in the initial and service cost of condensers is thereby effected.

It is among other objects to provide a machine of the above type which will assure the testing of only one sheet at a time, so that the testing response will not be impaired were an extra sheet to remain in place during the testing operation, which will be proof against operation when the supply of sheets to be tested has been exhausted or when any of the magazines in which the selected sheets are stacked is full; and which will be proof against operation while a magazine is being replaced, all to assure that the machine will test reliably at all times and that it is substantially proof both against idle operation and against injury to the operator.

The sheet feeding means and the magazine herein disclosed are the subject-matter of a divisional application, Serial No. 746,368, filed May 6, 1947.

In the accompanying drawings in which is shown one of various possible embodiments of the several features of the invention:

Fig. 1 is a view in side elevation of the completely assembled machine,

Fig. 2 is a side elevation on a larger scale of the operating portions above the bed of the machine as shown in Fig. 1, Fig. 3 is a view in front elevation partly in section, looking in the direction of the arrows on line 3—3 of Fig. 2, Fig. 4 is a view similar to Fig. 3 with parts removed showing the machine in the process of rejecting a defective sheet, Fig. 5 is a view in transverse cross-section taken on line 5—5 of Fig. 3, Fig. 6 is a view on a somewhat larger scale showing the pneumatic valve operating cam and associated structure and taken on line 6—6 of Fig. 5, Fig. 6a is a detail view or perspective of a fragment of the pneumatic control valve plate, Fig. 7 is a view on a larger scale in longitudinal cross-section showing the construction of the supply magazine, Fig. 8 is a similar view showing the testing block and associated structure, Fig. 9 is a detail view taken on line 9—9 of Fig. 5, Fig. 10 is a view in transverse cross-section taken on line 10—10 of Fig. 5, Fig. 11 is a view in transverse cross-section taken on line 11—11 of Fig. 2, and Fig. 12 is a circuit diagram showing the various electrical controls incorporated in the machine.

Referring now to the drawings, the machine as shown in Fig. 1 has a bed or bed plate 15 carried on support legs 16 between which may be accommodated a vacuum tank 17, kept exhausted by a suitable vacuum pump (not shown). The operating motor 18 for the machine is suspended from a bracket 19 under the bed 15.

Upstanding on the bed 15 are the supply magazine 20 containing the sheets to be tested and classified, the testing block 21, the collector magazine 22 for the selected sheets that are up to specifications and finally the collector magazine 23 for the rejected sheets, sometimes called the reject magazine. Each magazine is removably affixed by set screws 24 in a corresponding socket 25 mounted upon the bed.

The supply magazine as best shown in Fig. 1 and Fig. 7 has a metal follower 26 therein, preferably a spring urged follower to be fully described hereinafter, and which serves to maintain the stock in elevated position within its magazine.

For convenience the supply and collector magazines may be interchangeable. However, since there is no need for urging the sheets upward in the latter magazines, bearing in mind that the sheets are to be delivered thereinto rather than picked off therefrom, it is sufficient to provide friction followers 27 in said magazine, which are pushed downward as sheets are pressed thereinto in manner to be described presently.

The testing block, best shown in Fig. 8, comprises a conducting rod 30, which passes through an insulating bushing 31 affixed by screws 32 into the bed 15 and is encased by an insulating cylinder 33 affixed in a socket 34 upon said bed and having insulated bushings 35 therein, which maintain the rod in concentric relation relative thereto. Slidably fitted in the upper end of the testing block is a metal platform 36 affixed by screws 37 upon leaf spring 38 of U-shape, with sinusoidal legs, the ends of which are affixed by screws 39 to the extremity of the rod 30.

High tension alternating current derived from the secondary 40 of a transformer (Fig. 12) the primary 41 of which is supplied from mains $m'$ and $m^2$ is passed through the rod 30 of the testing block by way of insulated cable 42 affixed to the base of rod 30. A rubber nipple 43 that encases the lower end of the bushing 31 insulates the high tension cable from the bed of the machine. The high tension testing current passes through the testing head 44 hereinafter to be described, which presses the sheet to be tested against platform 36.

Referring more especially to the enlarged detailed views of Figs. 2, 3 and 5, the motor 18 drives a sheave wheel 45 by a V-belt 46 extending through the bed and driven from a pulley 47 on the motor shaft. The sheave wheel is mounted upon a jack shaft 48 carried at one end in a main upstanding bearing plate 49 supported upon the bed 15 and having a second journal in a bearing bracket 50 also bolted to said bed. The jack shaft carries a small gear or pinion 51 which meshes with a larger gear 52 upon a cam shaft 53, desirably somewhat behind and above the jack shaft. The cam shaft 53 has a bearing at one end in bearing plate 49 and a second bearing in bracket 54. Upon the cam shaft are rigidly affixed the various cams, three in number, to be described hereinafter, which determine the action of the machine.

The sheets from the supply magazine 20 are successively to be picked off therefrom, by resort to a pick-up head 56 normally registering with the supply magazine 20 as shown in Fig. 3 and to be transported for laying the sheet upon the testing block 21.

The pick-up head in the preferred suction-operated embodiment, is perforated at its lower face as at 57, its upper face being threaded upon nipple 58 in a vertical tube 59 to the upper end of which is affixed the nipple end of a flexible hose 60 connected at its free end (not shown) to the valve base 128. By suitable control, to be described hereinafter, the suction is applied to the pick-up head in its lifting and transporting operation and is released when the sheet is to be deposited upon the testing block.

The testing or selector head 44, preferably also suction-operated and of the same construction as the pick-up head 56 is normally in registry with the testing block (Fig. 8) and its normal function is to close the testing circuit and then to pick up the tested sheet and if up to specifications to deliver it to the top of the collector magazine 22.

As will be described hereinafter, arrangement is made for selectively advancing the selector head 44 through a longer path in response to the test of a sheet below specifications, to deliver the same up to the reject magazine 23.

Thus, the pick-up head 56 is constrained to have a constant backward and forward movement from the top of the supply magazine 20, where it picks up a sheet to the top of the testing block 21, where it deposits the sheet. The selector head 44 has a backward and forward movement from the top of the testing block, where it transmits testing current, then picks up the tested sheet and transports it to the top of a collector magazine, the range of movement of the selector head being determined by the character of the sheet being tested, to classify the sheets, as will be more fully set forth hereinafter.

It will, of course, be understood that the suction heads must lift free of the magazine and testing block respectively before they can move laterally from the supply magazine to the testing block, and from the testing block to a collector magazine respectively, and cannot descend into such delivery station until conclusion of the lateral transfer or transport movement. To bring this action about, it has been found advantageous to move the two suction heads vertically up and down in their lifting and delivery action, and to transport them horizontally in the intervening travel between the stations of pick up and delivery.

Reverting now to the drawings, the bearing plate 49 is provided with two sets of bearings 61 and 62 at opposite ends thereof that accommodate a rail structure, desirably a pair of horizontal parallel rails, preferably slide tubes 63 and 64. Upon the rails 63, 64 is a carriage 65 which comprises a bracket 66 having a pair of parallel, horizontal sleeves 67 unitary therewith and embracing the tubes 63, 64 and affixed thereto as for instance by taper cross pins 68. The sleeves 67 of the carriage 65 have eyes 70 and 71 that slidably accommodate the tube 59 upon the lower end of which is carried the pick-up suction head 56, and to the upper end of which the flexible suction hose 60 is connected as previously described. The tube 59 is affixed by means of cross pin 72 to a cross bar 73 provided with rollers 74 that ride in a track 75 comprising a pair of rectangular bars 76 affixed as by screws 77 to a back plate 78.

The selector head 44 is mounted upon a carriage 80, generally similar in construction to the carriage 65 and similarly mounted upon the slide rails 63 and 64, except that said carriage is not rigidly affixed to the slide rails as is the carriage 65, but is slidable thereon in a manner and for the purpose to be set forth hereinafter.

In handling a dielectric sheet which is up to standard, the carriage 80 is entrained as a unit with the slide rails 63, 64 by tension through a drag link 81 pivotally affixed thereto at one end, as at 82, and fixed at its other upon a pivot 83 threaded at 84 upon disk 85 keyed at 86 upon axle 87 through a tractor frame 88 that has sleeves 89 which encircle the respective slide rests 63, 64, and which are rigidly affixed to said rails, as by means of taper cross pins (not shown).

Upon any sliding movement of the rails 63, 64, the pick-up carriage 65 (which mounts the pick-up head 56) will move as a unit with said rails and the fixed frame 88 which also moves with the rails, will entrain the selector carriage 80 by tension transmitted through the drag link 81, so as likewise to move as a unit with the rails. As in the case of the pick-up carriage 65 the selector head tube 90 vertically slidable in the selector carriage 80 has a cross bar 91 affixed thereto, with rollers 92 that ride in the long groove between the rectangular bars 76 of the elevator track 75.

The up and down movement of the suction heads 56 and 44 is effected in unison by lifting the elevator track member 75 and with it the cross bars 73 and 91 and the tubes 59 and 90 respectively affixed thereto, that carry the respective pick-up and selector heads 56 and 44. The mechanism for lifting the said elevator track member comprises the elevator cam 92 affixed to the cam shaft 53, presenting a closed generally circular groove 93 with diametrically opposed outward enlargements 94 and 95. Roller 96 on the end of an arm 97 rides within groove 93. The opposite end of arm 97 is keyed upon an axle 98 upon which is also keyed an upstanding arm 99 pivoted at its upper end to a short link 100, the opposite end of which is pivoted to a collar 101 rigidly affixed upon a horizontal rod 102 threaded into ferrules 103 at the opposite ends thereof, that are secured upon the rod by nuts 104. The ferrules at opposite ends of rod 102 have respectively pivoted thereto upstanding links 105 and 106, keyed upon corresponding stub shafts 107 and 108 bearing in the plate 49, to which are also keyed generally horizontal arms 109 and 110 respectively, which extend toward the right in Fig. 3 and are pivoted at their free ends to near the opposite ends of the back plate 78 of elevator track member 75.

The lateral movement of the carriages 65 and 80 with the slide rails 63, 64 that carry them is effected from transfer or transport cam 111 which is also affixed upon the cam shaft 53. Cam 111 has a closed cam groove presenting a circular arc 113 of smaller diameter, a circular arc 114 of larger diameter and connecting arcs 115 therebetween. Cam roller 116 upon the upper end of arm 117 rides in cam groove 113—115. The lower end of arm 117 is keyed upon axle 118, which latter has rigidly affixed thereto a longer arm 119, the upper end of which is pivoted to a short link 120, the free end of which is pivotally connected at 121 to the pick-up carriage 65 that is fixed to slide rails 63, 64.

The stroke of the slide rails in the transfer or transport is equal to the distance between the supply magazine 20 and the testing block 21 which in turn is equal to that between the testing block 21 and the main collection magazine 22. It, therefore, follows that in the transport action, the pick-up head 56 will travel into registry with the testing block 21 and the selector head 44 will come into registry with the collector magazine 22. The elevator cam 92 and the transport cam 111 are so timed that the transport action only commences after the elevator action through cam enlargement 94 has caused the suction heads to clear the magazines and the testing block, and the suction heads descend into magazine or testing block through the action of cam enlargement 95 only after the conclusion of the transport action.

In properly timed relationship with the elevator and transport cam action is the application of the suction to the two heads for the pick-up action, and the discontinuance of such suction for the release action. That action is controlled by a third or pneumatic control cam 125 upon the same cam shaft as the other two cams 92 and 111. For the application and discontinuance of the suction, the suction tube 126 from the vacuum tank is connected to the respective suction heads 56 and 44 through a valve structure shown in Figs. 5 and 6.

The valve structure comprises a standard 127 mounted upon the bed 15 and conformed at its upper end as a fixed valve base 128 with a port 129 therethrough leading to hose 60. A valve cover plate 130 mounted on bolts 131 through the fixed valve plate 128 is resiliently pressed by springs 132 which encircle said bolts, against a movable valve plate 133 interposed between the cover plate and the valve base. The movable valve plate is pivoted upon cross shaft 134 through the standard 127 and is generally Y-shaped. It has an upstanding arm 135, the upper end of which serves as the valve proper, a generally downwardly directed arm 136, which carries the roller 137 that rides upon the cam 135 and a third outstanding arm 138 urged downward by a coil spring 139 fixed to the end thereof, and anchored to the bed at its opposite end 140. The upper bolt 131 is above the upper end of movable valve plate 133, while the lower bolt 131 passes through elongated aperture 141 through said plate, to permit movement of the latter. When port 142 through valve plate 133 registers with the port 129 through valve base 128 and corresponding port 143 through valve cover plate 130, suction is effectively transmitted from the vacuum tank 17 through the conduit 126 and thence from the valve to conduit 60 to the two suction heads 56 and 44. The valve plate 133 is movable to bring aperture 142 out of registry with the aligned ports 129 and 143 and to bring into registry with port 129 a notch 145 in said valve plate, which is effective to vent the suction heads and thereby discontinue the suction.

To apply the high tension testing current at the correct instant to the testing block upon which a sheet had been laid by the pick-up head 56, a timer 150 mounted on the cam shaft 53 is introduced in the test circuit as indicated in Fig. 12, so that the high tension current is applied for an instant when the testing or selector head 44 presses the dielectric sheet to be tested snugly into contact with the platform 36 therefor. There is thus closed a circuit (see Fig. 12) from the transformer secondary 40 by way of rod 30 through platform 36, selector head 44, through relay coil 151 and timer 150 back to the other terminal of the transformer secondary 40.

The timer, as suggested for instance in Fig. 11, may be of construction more or less conventionally used on automobile ignition systems, except that the cam 152 thereof has but one irregularity to cause the spring closing of contact arm 153 against contact 153' to occur but once in each revolution of the cam shaft in correct phase relation for the desired purpose.

When a sheet is being tested that has good dielectric properties, i. e. one that will not break through or permit excessive leakage, the leakage current through solenoid coil 151 will be insufficient to actuate the same, so that the selector head 44 will subsequently transfer the tested sheet to collector magazine 22 in the manner previously described.

Immediately after the selector head 44 has left the testing block 21, a blast of air is blown through the apertures 153 in the platform 36 of the testing block to blow out any sheet that may not have been picked up by the selector head in the previous cycle, due for instance to jamming in place thereon. There is thus assurance that if the selector head shall have failed to pick up a tested sheet, the same will be reliably expelled, so that the testing current will in each case be applied through the thickness of a single sheet only rather than through one or more superposed sheets. The timing of the blast blown through nozzle 179 in the side of the testing block may be controlled from any of the cams in manner readily understood and, therefore, not shown.

If the dielectric sheet should break down or show excessive leakage on the test, the solenoid 151 will be effective to close switch 154 so that a circuit will then be completed from the main $m'$ through said switch to solenoid 155 and by way of conduit 156 to second main $m^2$. Solenoid 155 operates the selective or classifying mechanism in manner presently to be described. Though relay 154 opens immediately upon opening of the timer contacts 153', solenoid 155 nevertheless remains in circuit until it has performed its function. This is brought to pass by coil 157 in parallel with solenoid 155. When initially actuated that coil closes switch 158, and the circuit to coils 155 and 157 remains closed regardless of the opening of relay 151, 154 by reason of the fact that the circuit extends from main $m'$, by way of conduit 159, switch 158, solenoids 157 and 155 in parallel, and conduit 156 to companion main $m^2$.

Solenoid 155 as shown best in Fig. 5 serves to actuate the mechanical control for modified travel of the selector head 80, preferably to transport the rejected, defective or low-resistance sheet, through a longer stroke to the second collector magazine 23. To this end the solenoid 155 operates upon the end of a lever 160 pivoted at 161 to frame 162 and carrying at its opposite extremity a cross-bar 162 normally urged downward by coil spring 177 to depress roller 164 on the extremity of a pawl 165, that is pivoted at 166 to drum 167 which is keyed at opposite extremity a cross-bar 163 normally maintained in ineffective position with respect to a ratchet wheel 169 riding freely upon axle 87. That ratchet wheel is normally retained against retrograde movement by a detent pawl 170 pivoted to drum 167 and both pawls 165 and 170 are urged toward the ratchet wheel by an intervening leaf spring 171.

Ratchet wheel 169 is affixed as by screws 172 to a gear 173, also freely mounted upon the axle 87. Gear 173 meshes with a rack 174 affixed to the frame 49.

The drum 167 has a strap 175 affixed thereto, the other end of which is connected to a tension reel mounted upon the frame and which may be an ordinary typewriter ribbon reel 176 that is equipped with a coil spring therein (not shown) which is tensioned as the strap 175 is wound about the drum 167.

It will thus be seen that when solenoid 155 is actuated under the excessive leakage through a defective or below-standard sheet, the free end of lever 160 is moved upward thereby about its pivot 161 to raise the bar 163 from the roller 164 and permit the spring 171 to force the pawl 165 against the corresponding tooth on the ratchet wheel 169. As the slide rails 63, 64 are moved to the right in the transfer operation of the machine, and the frame 88 is carried therewith, gear 173 in its rolling movement upon the rack 174 and by reason of its effective pawl connection with the drum 167 rotates the latter therewith, to wind the strap 175 thereabout and tension the spring in the tension reel 176. Thus, the axle 87 is caused to rotate in the movement of the slide rails 63, 64 to the right, and thereby to rotate therewith the disk 85 and to cause the pivot 83 thereon to advance through an angle of 180 degrees and correspondingly to advance the drag link 81. The selector carriage 80 is thus slid along the slide rails by tension transmitted through drag link 81 to approach the frame 88 and to recede from the pickup carriage 65, that is to be shifted in the course of said slide rail movement from the trailing position of drag link 81 shown in Fig. 3 to the leading position thereof shown in Fig. 4. It follows that the selector carriage 80 and the selector head 44 carried thereby will have been moved in response to the test of a defective sheet through the normal stroke of the sliding rails 63, 64 to which is superadded the stroke imparted by the movement of the drag-link 81 from trailing to leading position. That latter movement is equal to the distance between the two collector magazines 22 and 23, so that the selector head will therefore have been brought into registry with the magazine 23 for the below-standard sheets.

When the slide rails 63, 64 reach the end of their movement toward the right, they engage and shift the spring 180 which actuates plunger 181 to open the switch 182 (see Figs. 3 and 12). When that switch opens, the circuit to the relays 155 and 157 is interrupted so that the spring 177 returns the lever 160 to home position in which it depresses the roller end 164 of the pawl 165 to disengage said pawl from the ratchet wheel 169. Accordingly, the tensioned spring in the tension reel 176 will wind up the strap 175 and assist the drum 167 to rotate axle 87 and with it disk 85. Disk 85 is thus rotated back through the half-turn, which it has been advanced, so that the carriage 80 will be pushed by the drag link 81 from the position of Fig. 4 back to that of Fig. 3.

By reason of the resiliency, especially of mica sheets when stacked under compression, there would be danger of many of such sheets being catapulted from the top of the magazine upon release of the pick-up or selector head after it had pressed downward for compression of the stack in the course of operation. To prevent such catapulting of sheets from the magazine, means is provided, now to be described. A sleeve 185 about the magazine (see Fig. 7) is equipped with transverse pins 186 which serve as pivots for a pair of upstanding levers 187 and 188 that are pressed toward each other by a coil spring 189 connecting the upper ends of said levers, and desirably anchored to cross pins 190 thereof. Pins 190 serve as pivots for clamping heads 191, each equipped with a resilient shoe 192 desirably of rubber, retained by said spring 189 to extend through corresponding slots 193 in the magazine into engagement with the lateral edges of the sheets near the top of the stack. Lever 187 has a horizontal arm 194 at its lower end with a cross-pin 195 extending through yoke 196 in the corresponding arm on lever 188. Lever 187 desirably has an oblique upper extension lug 197 in the path of movement of a screw head 198 on the extremity of a pilot rod 199 which is parallel to suction head tube 59 and mounted therewith upon cross-bar 73. As the pick-up head 56 is urged downward into the magazine 20, the end 198 of pilot rod 199 cams the lug 197 of lever 187 outward to release the shoe 192 from the stack of sheets in the magazine, and through the transmission of arms 194 and 196 similarly to release the shoe on the other lever 188, so that as the suction head reaches the top of the stack, the shoes 192 no longer clamp the mica. As the pick-up head 56 engages the stack and is pressed downward thereon the latter will be compressed correspondingly to urge the follower 26 downward in the magazine 20.

In the subsequent rise of the suction head, the pilot end 198 will release the cam end 197 of lever 187, and before the suction head has left the magazine the lateral clamping shoes 192 will thus be urged back by spring 189 to grip the edges of the upper sheets in the stack, so that the catapulting of sheets under the resilience of the compressed stack will not occur upon withdrawal of the suction head from the magazine.

Inasmuch as the pick-up head has a fixed up and down stroke, it is important that the upper dielectric sheet in the supply stack be urged upward so as to assure engagement thereof with the suction head, even though the supply in the stack nears exhaustion. To that end the follower 26 is provided with a rod 200 extending axially through the socket 25 of the magazine, a crossbar 201 being secured to the lower end thereof by nut 202. A pair of long coil springs 203 anchored to the ends of said crossbar at their lower ends are connected to pins 204 protruding from the lower part 25' of the magazine socket 25. It is desirable in this connection to have the upward thrust of springs 203 occur only after the suction head has entered the magazine and while the lateral shoes 192 are released. To this end the rod 200 extends through an aperture 199 in a brake arm 205 pivoted to a lug 206 in the base 25', of the magazine socket and urged obliquely upward by a coil spring 207 anchored at one end to a crosspin 208 through the free end of said arm 205 and at the other end to a pin 209 in the base 25', so that the diagonally opposite edges of the aperture 199 in the arm will grip the rod 200 and brake or lock the same against operation by the springs 203.

Momentarily to release brake arm 205 at the desired instant, there is provided a cam lever 210 pivoted about axle 211 and having an oblique lower cam end 212 engaging the crosspin 208, so that when the lever is shifted to the right in Fig. 7 through but a small angle, the arm 205 will be pushed downward slightly to relax its grip upon the rod 200, which will thus be spring-urged upward for the desired purpose. The lever 210 is preferably operated from one of the cams, desirably from the elevator cam 92. For that purpose cam 92 is provided with an enlargement or abutment 213, desirably attached to the periphery thereof which may come into contact with roller 214 upon the upper end of the lever 210, so that, for the short interval that said short enlargement engages the lever, brake-arm 205 will release rod 200. As soon as the abutment 213 has passed the lever roller 214, the lever 210 will be pushed back to the position shown in Fig. 7 by the action of the spring 207 and the crosspin 208 against the camming end 212 of said lever 210.

Desirably, the various magazines 20, 22 and 23 are removable from the bed of the machine, for replacement. To this end the socket of each magazine is provided with a hub 216 that encircles the rod 200. The socket is laterally introduced through a corresponding slot 217 in the bed 15 of the machine, the flanges 218 on the socket base engaging the faces of said bed. Each magazine is kept in place by a corresponding latch 219 pivoted at one end to the edge of bed 15 to one side of the slot 217 and having a notch 220 at the opposite end straddling the shank of the screw 221 at the opposite side of said slot.

The magazine has lateral studs 222 protruding outward from the lower part thereof and passed through lateral slots 223 in the socket 25 through which the magazine is laterally introduced. It is secured in place by tightening of the nuts 24 threaded upon said studs.

The machine is also equipped with means for automatically interrupting the operating circuit when the supply magazine is empty or when any of the collector magazines is full. To this end, the follower 26 in the supply magazine is brought into contact with a leaf spring 225 (Fig. 2) which protrudes into the magazine through a slot 226 therein, so that (see Fig. 12) the follower when it reaches the uppermost position closes a grounding circuit from the secondary 227 of a low voltage transformer, whose primary is at 228 through solenoid 229. Solenoid 229 opens switch 230 which interrupts the circuit to relay 231. The current to coil 232 connected to the third main $m^3$ of the three phase circuit shown is, therefore, interrupted, and contactor 233 thus released thereby is spring-urged to open circuit position. Relay 231 is of the type that will reclose only by manual thrust, so that the safety of the operator is assured.

In a similar way, the collector magazines 22 and 23 are provided each with a contact spring 235 engaging the corresponding follower 27 when the latter reaches the lower end of the magazine, i. e., when the magazine is full. These connections are in the same grounding circuit, but in parallel with the connection 225, so that the operation above set forth will occur whenever any of the collector magazines is filled.

To permit manual operation of the machine, particularly for adjustment purposes, the jack shaft 48 is provided with a hand wheel 48'.

*Operation*

While the operation has been indicated in the course of the above description, such operation will be summarized for ease of reference.

The supply magazine 20 being filled with a stack of the sheets to be tested, the relay 231 is manually reset, thereby to close circuit from main $m^3$ through actuating coil 232, which effects closure of the main circuit through contactor 233. The electric motor 18 drives sheave wheel 45 through pulley 47 and belt 46. Sheave wheel 45 turns jack shaft 48 on which it is mounted and through pinion 51 and gear 52 drives the cam shaft 53.

As the operation proceeds, groove enlargement 94 of the elevator cam 92 depresses roller 96 and moves arm 97 to rock axle 98 and with it to move arm 99 to the left (Figs. 3 and 4). Through link 100, said arm shifts collar 101 and with it rod 102 to the left. By that action, the links 105 and 106 at the ends of said rod are moved in clockwise direction about their respective axes 107 and 108 and thereby rock the associated links 109 and 110 downward to move the elevator track 75 downward, and the cross bars 73 and 91 are moved downward therewith, causing the suction heads 56 and 44 respectively to be pressed vertically downward therewith in their bearing supports in the respective carriages. The suction heads thereby enter respectively the supply magazine 20 and the testing block 21. At this stage, the pneumatic control cam 125 (see Fig. 6) depresses roller 137 and moves the Y-shaped valve plate 133 about its axle 134 to bring the port 142 into registry with the corresponding ports 129 and 143 respectively in the fixed plate 128 and the cover valve plate 130 (see Fig. 5). The suction from the vacuum tank 17 is thus effectively applied by way of suction tube 126 through suction hose 60 to the two tubes 59 and 90, so that pick-up head 56 will attract the top sheet in the supply magazine 20, while selector head 44 will attract the sheet upon the testing block.

As the suction head 56 reaches the top of the stack in the supply magazine 20, the pilot rod 199 which moves in unison with the suction head reaches and engages the oblique lug 197 on the lever 187 and thereby rocks the same about its pivot pin 186, to shift the gripping shoe 192 out of slot 193 against the resistance of spring 189 and through the pin and slot connection 194—196 similarly to shift the shoe of the companion lever 188.

While the pick-up head is in the supply magazine, the lug 213 on the elevator cam 92 reaches the roller 214 on the upper end of lever 210 and thereby pivots the latter outward about its bearing 211, to cause the lower cam end 212 thereof slightly to depress the braking arm 205 against the resistance of its spring 207. The springs 203 are thus released for upward movement of the follower 26 to press the stack upward for its top sheet to be pressed against the suction head 56. The lug 213 is so short that the braking arm 205 is released for but an instant, the spring 207 in its return, shifting the arm 205 back to the position shown in Fig. 7 and relocking the rod 200 against further movement by the springs 203.

While the selector head 44 is pressed upon the testing block 21 as above noted, the timer 150 will have reached a position to close contact for an instant and to apply high voltage as suggested in the drawings, illustratively 5000 volts, to the sheet on the platform 36, the circuit being made through said head 44. The pressure applied by the selector or testing head 44 will be taken resiliently by spring 38, and the circuit will be reliably completed without the danger of a loose contact in the case of an exceptionally thin sheet or of excessive pressure upon an exceptionally thick sheet. Before the selector head enters the testing block, the blast of air through nozzle 179 blows out any sheet that may have become jammed against platform 36 in the previous cycle.

Assuming that the sheet being tested is up to specifications, as ordinarily it should be, the leakage current through the tested sheet, will be insufficient to actuate the relay 151, so that no rotation of disk 85 on frame 88 will occur.

The elevator cam 92 as noted has but a short protrusion 94 on its groove 93, so that it promptly urges the roller 96 inward again to reverse the depressing movement previously described and to elevate the elevator track 75. In that elevating action, the pick-up head while under suction will lift the uppermost sheet from the supply stack to clear the magazine, and the selector head likewise under suction will lift the tested sheet to clear the testing block.

Before the head 56 clears the supply magazine 20, the pilot rod 199 will have become disengaged from the lug 197 and the spring 189 will cause the shoes 192 to re-engage the stack, so that sheets from the latter will not upon clearance by the suction head, be catapulted upward by virtue of their resiliency.

When the section heads 56 and 44 have thus cleared the supply magazine and testing head, the transfer or transport operation sets in. Cam groove portion 113 of cam 111 moves arm 117 through roller 116 in clockwise direction (Fig. 3) about its axle 118 and correspondingly moves arm 119, which latter through link 120 pulls the carriage 65 toward the right in Fig. 3, and since said carriage is clamped to the guide rails 63, 64, the latter are moved therewith to the right in their bearings 61 and 62, the rollers 74 and 92 on the cross bars 73 and 91 respectively, riding along the track 75 which remains fixed during such operation. The transfer stroke is such, that the pick-up head 56 moves from registry with the supply magazine 20 to registry with the testing block 21. The frame 88 being likewise clamped to the slide rails is moved as a unit therewith and through drag link 81 entrains the sliding selector carriage 80, so that the selector head 44 with the tested sheet carried thereby enters into registry with the collector magazine 22.

At that stage, the enlargement 95 of the elevator cam 92 reaches the roller 91 to cause the elevator track 75 to move downward and to thereby move the pick-up head downward to deposit the sheet carried thereby upon the platform 36 of the testing block and at the same time to move the selector head downward into the collector magazine 22.

As the selector head 44 moves downward, concurrently with the movement of the pick-up head, it releases the stack holding shoes in the same manner as previously described with respect to the supply magazine and it depresses the stack and the corresponding follower 27 through the thickness of the sheet deposited thereon.

As the suction heads reach the lower ends of their respective strokes in the testing block 21 and the collector magazine 22, the pneumatic control valve cam 125 moves the valve plate 133 to bring the notch 145 thereof into registry with the port 129 of the associated fixed valve base 128, thereby to vent the suction heads 56 and 44 and allow them to release their sheets respectively upon the testing block and the collector magazine 22.

In the continued operation, the enlargement 114 of the transfer cam 111 becomes effective to actuate the linkage 117, 118, 119, 120, thereby to shift the carriage 65 and with it the slide rails 63, 64 and the frame 88 to the left and through the drag link 81 the carriage 80 is shifted back therewith to the initial position for repetition of the cycle set forth.

If there be no sheet on the testing block or if a sheet on the testing block should test below standard, the leakage current therefrom is sufficient to actuate the relay 151 and close switch 154 (see Fig. 12). The circuit thereupon is closed from main m' through switch 154 to solenoid 155. Solenoid 155 (see Figs. 5, 9 and 10) moves the free end of lever 160 upward and lifts the bar 163, thereby to permit the spring 171 to press the pawl 165 carried on drum 167 into the notch of ratchet wheel 169 and accordingly to lock the ratchet wheel and gear 173 to the drum 167. In the ensuing movement of the slide rails 63, 64 to the right, the gear 173 in rolling along rack 174 will, therefore, rotate the drum 167 therewith. Drum 167 drives axle 87 to which it is keyed, which, in turn, rotates the disk 85 keyed thereon. The pin 83 of the drag link 81 is thus carried around by disk 85 from the trailing position shown in Fig. 3 through 180 degrees to the leading position shown in Fig. 4. Accordingly, the carriage 80 which is slidable on the slide rails is advanced during the movement of the slide rails through the added path imposed by the effective throw of the drag link 81, so that the selector head carried thereby is brought into registry with the second magazine 23 where the defective sheets are to be deposited.

In the affirmative drive of the drum 167 through the gear 173, the strap 175 is caused to tension the spring within the tension reel 176 and to take up lost motion or slack.

Regardless of the release of relay 151, since the timer 150 is closed for but an instant, the circuit through solenoid 155 is nevertheless maintained closed until it has performed its function. For, relay 157 in parallel with solenoid 155 closes switch 158 simultaneously with the original actuation of relay 154. The circuit of solenoids 155 and 157 remains closed because it extends from main $m'$, lead 159, switch 158, relays 157 and 155 in parallel back through lead 156 to companion main $m^2$.

At the extremity of the stroke of slide rails 63, 64 to the right, that is, when the transport or transfer has been completed, leaf spring 180 is raised, thereby to open switch 182 (see Figs. 3 and 12) so that the circuit to relays 155 and 157 becomes interrupted. Spring 177 therefore, depresses the free end of lever 160. The gear 173 is turned back in the return movement of the slide rail 63, 64, and through pawl 170 it drives drum 167 to return drag link 81 to the trailing position shown in Fig. 3. Near the end of this return movement, roller 164 of pawl 165 reaches and is pressed against bar 163 to release the pawl 165 out of engagement with the ratchet wheel 169. The stressed wound tension reel 176 now holds the drum 167 and with it the axle 87 and disk 85 and the drag link 81 in position shown in Fig. 3, preparatory for the next cycle of movement above described, of selection or rejection, as the case may be. In the return stroke of the transfer mechanism, the suction heads will accordingly return to the position shown in Fig. 3.

When the supply magazine is completely emptied, the follower 26 will have approached the upper end thereof, so that it engages the spring 225 to close the grounded circuit (see Fig. 12) from the low voltage secondary 227 through the relay coil 229 to open switch 230. The relay 231 then opens to de-energize the contactor operating solenoid 232 and to interrupt the circuit from the mains. Upon removal of the supply magazine in manner clear from the previous description and replenishment thereof by a fresh magazine, circuit cannot be closed until the relay 231 is manually reset, so that the operator is protected.

Exactly the same operation occurs when either of the collector magazines 22 or 23 has been completely filled, in which case the grounding circuit is established by engagement of the follower 27 with the associated spring 235 at the bottom of the magazine.

It will of course be understood, that while magazine 23 was designated the reject-magazine, the sheets therein may nevertheless be useful either for condensers of lower specifications or when used in pairs, may afford sufficient di-electric strength for low capacity high voltage condensers.

The machine is not necessarily limited in its utility to segregate relatively unsatisfactory from satisfactory sheets. It could be used for instance to sort sheets for their respective dielectric capacity. This would predetermine the inherent capacity of each sheet, thereby making it possible to assemble a stack to a very close capacity tolerance. This would be even more suitable than gauging the dielectric sheets for thickness. The machine could also be used to measure the power factor of each sheet thereby insuring a low loss assembled stack whose power factor would be below a predetermined value set by the machine.

As many changes could be made in the above machine and many widely different embodiments of this invention could be made without departing from the scope of the claims, it is intended that all matter contained in the above description or shown in the accompanying drawings, shall be interpreted as illustrative and not in a limiting sense.

Having thus described my invention, what I claim as new and desire to secure by Letters Patent of the United States is:

1. An automatic electrical machine for selectively rejecting below-standard dielectric sheets, said machine comprising a supply magazine, a testing block and a pair of collector magazines, one nearer the testing block for the selected sheets and the other at a greater distance therefrom for the rejected sheets, means for feeding the sheets in sequence from the supply magazine to the testing block, means for applying testing current to each sheet while on the block, means for feeding the successive sheets from the testing block, and means responsive to the electrical property of a normal sheet as determined on the testing block to deposit such sheets in one magazine and an auxiliary drive responsive to the testing current on a defective sheet to superimpose upon said normal feed a further displacement upon the sheet to deposit the rejected sheets in the other magazine.

2. In an automatic machine for classifying dielectric sheets, the combination of a supply magazine, an electrical testing block, means for applying test current therethrough, and collector magazines for the respective classes of tested sheets and at different distances from the testing block, a bed mounting said magazines and said block, a pick-up head, means for moving the same from the supply magazine to the testing block and return for picking up successive sheets from the supply magazine and transporting them to and depositing the same upon the testing block, a selector head, means for moving the same from the testing block to a collector magazine and return for picking up the successive sheets from the testing block, and transporting them to and depositing the same upon a collector magazine, and means controlled by an electrical characteristic of the sheet determined at the test block, selectively to control the length of travel of the selector head for deposit of the sheet carried thereby in the corresponding collector magazine.

3. In a machine of the character described, in combination, a supply magazine, an electrical testing block, a bed mounting said magazine and said block, a rail structure, carriages mounted upon the said rail structure, one of said carriages having a pick-up head normally registering with said supply magazine, means for causing relative movement of approach and recession of said head and said supply magazine for picking up a sheet from the latter, means for causing movement of said pick-up head lengthwise of said rail structure, for registry with said testing block, deposit of the sheet thereon and return of said head to registry with the supply magazine, a testing head on one of said carriages for coaction with said testing block and the sheet thereon to be tested, and for transfer thereof for removal of the tested sheet from the testing block after the testing operation.

4. In a machine of the character described, the combination of a supply magazine for dielectric sheets, a testing block, means for applying testing current thereto, and a plurality of collector magazines for the classified sheets, a rail structure, a pick-up head mounted thereon and a selector head normally registering respectively with the supply magazine and the testing block, means for moving said heads in unison, automatically to shift the pick-up head to transport a sheet to the testing block and concurrently to move the selector head to pick up the sheet from the testing block and deliver it to one of the collector magazines, and means controlled by the electrical response of the sheet being tested on the testing block to move said selector head to a corresponding position out of registry with said collector magazine and means for effecting discharge of the carried sheets respectively to the testing block and to the collector magazine selected by the test.

5. In a sheet dielectric classifying machine, the combination of a bed, a supply magazine, a testing head and collector magazines all mounted upon said bed in aligned relationship, a pick-up head normally in registry with the supply magazine, means for imparting a uniform cycle of movement thereto for transporting the dielectric, one sheet at a time, from the supply magazine to the testing block, a selector head normally in registry with the testing block, and means for imparting to said latter head a selective cycle of movement, said means including a normal transmission by which said selector head delivers to one of the collector magazines, and a selector transmission for superimposing additional movement upon the normal movement of said head a testing circuit, and a relay therein, responding to the leakage of the dielectric sheet being tested to determine the action of said selective transmission.

6. A sheet dielectric classifying machine, comprising a bed having a plurality of sheet magazines affixed thereto, including a supply magazine and a collector magazine, an electrical testing block interposed between said magazines, a pick-up carriage and a selector carriage, a pick-up head on the former carriage normally registering with said supply magazine, a selector head on the latter carriage normally registering with said testing block, means for moving said carriages in unison to shift the selector head from the testing block to the collector magazine, while concurrently moving the pick-up head from the supply magazine to the testing block, means for shifting the selector carriage relative to the pick-up carriage, said means being responsive to a departure from normal in an electrical characteristic of a sheet upon the testing block, to cause the selector head to transport an undesired sheet to be deposited outside of the magazine and means to return the selector head to normal position after such operation.

7. A sheet dielectric classifying machine, comprising a bed having a plurality of sheet magazines affixed thereto, including a supply magazine and a collector magazine, an electrical testing block interposed between said magazines, a pick-up head normally registering with said supply magazine, a selector head normally registering with said testing block, means for moving said heads upward for pick-up and downward for depositing action, said means comprising a carrier for said heads extending transversely thereof, and means for transporting said heads laterally to shift the selector head from registry with the testing block to registry with the collector magazine, and the pick-up head from registry with the supply magazine to registry with the testing block, and means for shifting the selector head relative to the pick-up head, said means being responsive to a departure from normal in the electrical response of a sheet upon the testing block to cause the selector head to transport a sheet outside of predetermined specifications, to be deposited outside of the magazine, and means to return the selector head to normal position after such operation.

8. A sheet dielectric classifying machine comprising a bed having a plurality of sheet magazines affixed thereto, including a supply magazine and a collector magazine, an electric testing block interposed between said magazines, a pick-up carriage and a selector carriage, a rail structure mounting said carriages, a pick-up head vertically slidable in the pick-up carriage and normally registering with said supply magazine, a selector head vertically slidable in the selector carriage and normally registering with said testing block, means for moving said carriages in unison lengthwise of said rail structure, to shift the selector head from the testing block to the collector magazine, while concurrently moving the pick-up head from the supply magazine to the testing block, an elevator track correlated with both said pick-up and said selector head to change the elevation of said two heads concurrently, said carriage shifting means and said head elevating means being correlated for movement of the latter immediately before and immediately after the carriage sliding movement, means effecting release of the carried sheet from the respective heads at the end of the delivery stroke of each of said heads, and means for shifting the selector carriage along the rail relative to the supply carriage, said means being responsive to a departure from normal in the electrical characteristic of a sheet upon the testing block, to cause the selector head to transport a sheet outside of predetermined specifications to be deposited outside of the magazine, and means to return the selector head to normal position after such operation.

9. A sheet dielectric testing and classifying machine comprising a bed, a supply magazine, a collector magazine, an electrical testing block interposed midway between said magazines and a reject magazine beyond said collector magazine, a horizontal slide structure and a horizontal elevator structure, a pick-up carriage affixed to said slide structure, a selector carriage slidable with respect to said slide structures, a tractor frame affixed to said slide structure and connected to said selector carriage, each of said carriages having a tube vertically slidable therein, carrying respectively a pick-up head and a selector head at the lower end thereof normally registering respectively with the supply magazine and the testing block, a horizontal elevator structure supporting said tubes, means for operating said slide structure to advance the respective heads for registry of the pick-up head with the test block and of the selector head with the collector magazine, means for operating the elevator in timed relation therewith for raising and lowering the tubes respectively at the beginning and end of each stroke of the slide structure, and means controlled by the electric response in the test operation to actuate the tractor frame for a defective sheet, to slide the selector carriage along the slide structure to cause registry of the selector head with the reject magazine.

10. In a sheet dielectric classifying machine, the combination of a bed, a supply magazine and a collector magazine rising therefrom, an electrical test block rising from said bed midway between said magazines, means for applying testing current to a sheet on said test block, and a reject magazine beside said collector magazine, a horizontal slide structure, means slidably mounting the same, a pick-up carriage affixed to said slide structure, a selector carriage slidable upon said slide structure, a tractor frame affixed to said slide structure, a drag-link connecting said tractor frame to said selector carriage, a pick-up tube vertically slidable in the pick-up carriage, a selector tube vertically slidable in the selector carriage, each of said tubes having a pick-up head at the lower end thereof, cross-bars affixed to the respective tubes, a horizontal elevator bar supporting said cross bars, and automatic means for sliding the slide structure to advance the carriages with the tubes thereon from the supply magazine to the testing block and from the testing block to the collector magazine respectively, means in timed relation therewith for lifting and lowering the elevator bar to raise and lower the respective tubes at the beginning and end respectively of said slide movement, and means responsive to excessive electrical leakage in the testing operation to shift the drag link for moving the selector carriage through an added displacement for delivery to the reject magazine.

11. In a sheet dielectric classifying machine, the combination of a bed, a supply magazine, a collector magazine and a reject magazine rising therefrom, a horizontal rail structure, means slidably mounting the same, a pick-up carriage and a tractor frame fixed upon said rail structure, a selector carriage slidable upon said rail structure, a drag-link connecting said tractor frame to said selector carriage, a suction pick-up tube vertically slidable in the pick-up carriage, a suction selector tube vertically slidable in the selector carriage, a horizontal elevator, means on said tubes resting upon said elevator, and automatic means for sliding the rail structure to advance the suction tubes from the supply head to the testing block and from the testing block to the collector magazine respectively, means in timed relation therewith for lifting and lowering the elevator to raise and lower the respective suction heads at the beginning and end respectively of the slide movement, and means responding to the greater electrical leakage through a defective sheet upon the testing block to advance the drag-link along the tractor frame and thereby to slide the selector carriage forward along the rail structure through a range sufficient to cause its suction head and deliver to the reject magazine.

12. In an automatic sheet dielectric classifying machine, a supply magazine, a collector magazine, a testing block midway between said magazines, a horizontal slide rail, bearings therefor, a pair of carriages upon said rail, one of said carriages being fixed upon said rail and having a pick-up tube vertically slidable therein, the other carriage being slidable along said rail and having a selector tube vertically slidable therein, tractor means fixed on said slide rail and connected to said slidable carriage, an elevator bar, means affixed to said tubes having bearing mount with respect to said elevator bar to permit sliding of said rail with the carriages thereon and with their tubes longitudinally of said elevator bar and means for lifting and lowering said elevator bar to raise and lower the pick-up and delivery tubes in their respective carriages and with respect to the testing block and magazines.

13. An automatic sheet dielectric testing machine comprising a supply magazine, a collector magazine, a testing block midway between said magazines and a reject magazine, a horizontal slide rail, bearings therefor, a pair of carriages upon said rail, one of said carriages being fixed upon said rail and having a pick-up tube vertically slidable therein, the other carriage being slidable along said rail and having a selector tube vertically slidable therein, a tractor frame affixed to said slide rail, a disk carried by said frame, a drag-link pivoted to said disk at its advance end and to said sliding carriage at its trailing end, an elevator bar, means affixed to said tubes having bearing mount with respect to said elevator bar to permit sliding of said rail with the carriages thereon and their tubes longitudinally of said elevator bar, means for lifting and lowering said bar to raise and lower the pick-up and delivery tubes in their respective carriages, and with respect to the testing block and magazines, a relay connected to operate under the excessive electrical leakage when a defective sheet is being tested and means controlled by said relay to cause said disk to turn for drawing the delivery carriage along the rail by traction transmitted through said drag-link, to bring the selector tube into registry with the reject magazine in such case.

14. An automatic classifying machine for dielectric sheets comprising a supply magazine, a collector magazine, an electrical testing block midway between said magazines and a reject magazine, a horizontal slide rail, bearings therefor, a pick-up and a selector carriage upon said rail, said pick-up carriage being fixed upon said rail and having a pick-up tube vertically slidable therein, said selector carriage being slidable along said rail and having a selector tube vertically slidable therein, suction heads upon the lower ends of the respective tubes, a horizontal elevator bar supporting said tubes, a tractor frame affixed to said slide rail, having a rotatable disk thereon, a drag-link pivoted at one end near the periphery of said disk and at the other end to said selector carriage, said disk being normally freely mounted with said drag-link trailing, a relay under control of the leakage current through the dielectric sheet being tested on the test block and means under control of said relay when a defective sheet is being tested to cause the disk on the tractor frame to be driven for rotation thereof for a fraction of a revolution in the sliding movement of said slide rail thereby to advance the selector carriage along the rail concurrently with the advance of the rail itself to bring the selector tube into registry with the reject magazine, and means in timed relation with the movement of the respective carriages to raise and lower the elevator bar for lifting and lowering of the pick-up and selector tubes at the beginning and ends of the strokes of the rail for pick-up and release of the sheets respectively carried by said tubes, and automatic suction and release control for said suction heads operating in timed relation with the machine.

15. An automatic classifying machine for dielectric sheets, comprising a supply magazine, a collector magazine, an electrical testing block midway between said magazines and a reject magazine, a horizontal slide rail, bearings therefor, a pick-up and a selector carriage upon said rail, said pick-up carriage being fixed upon said rail and having a pick-up tube vertically slidable therein, and said selector carriage being slidable along said rail and having a selector tube vertically slidable therein, a horizontal elevator bar supporting said tubes, means responsive to the leakage through a defective sheet on the testing block to shift the selector carriage along the sliding rail through a range sufficient to cause the tube thereof to deliver into the reject magazine, said means including a tractor frame affixed to said rail, a disk having an axle through said tractor frame, a drag-link connecting said disk to said selector carriage, a gear concentric with said disk, a fixed rack meshing therewith, a pawl having a mount rigid with said disk, a ratchet wheel rigid with said gear and a solenoid actuated by the larger leakage current through a defective sheet to bring said pawl into coaction with the ratchet wheel for effecting positive drive of the disk with the rotation of the gear as it moves along the rack, thereby to cause the drag-link to be advanced with the rotating disk for the additional movement of the selector carriage required to effect delivery therefrom into the reject magazine.

16. The combination recited in claim 15 in which the disk has a drum rigid therewith, a strap thereabout, a tension reel mounting the other end of said strap and stressed by the rotation of said disk resiliently to take up lost motion.

17. In apparatus of the character described, a mechanism for rejecting dielectric sheets outside of a given range of electrical characteristics, said means comprising a tractor frame, means for laterally moving the same, said frame having an axle therethrough, a gear thereon, a fixed rack meshing therewith, a drum keyed to said axle, a pawl pivoted upon said drum, a ratchet wheel affixed with respect to said gear, means normally retaining said pawl out of engagement with said ratchet wheel and a relay responsive to the larger leakage current due to a defective sheet for permitting said pawl to engage said ratchet wheel, thereby to cause said drum to be turned with said gear in the movement of said tractor carriage, a selector carriage for selectively transporting tested sheets and a drag-link connecting said disk to said selector carriage to move the latter through the added stroke imparted by said drum whenever a defective sheet has been tested.

18. A dielectric sheet testing and classifying machine, comprising a pair of heads, means for raising and lowering the same, carriage means for the respective heads and serving to shift the same horizontally, a supply magazine registering with one of said heads, a testing block registering with the other of said heads, a cam shaft, a cam thereon, linkage operated thereby for controlling the horizontal movement of said heads, a second cam on said shaft, linkage operated thereby for controlling the vertical movement of said heads and means controlled by the excessive leakage current through a defective sheet being tested to shift one of said heads away from the other for transporting the defective sheet to a point beyond that to which satisfactory sheets are delivered.

19. A dielectric sheet testing and classifying machine, comprising a pair of suction heads, means for raising and lowering the same, carriage means for shifting the same horizontally, a supply magazine registering with one of said heads, a testing block registering with the other of said heads, a cam shaft, a cam thereon, linkage operated from said cam for controlling the horizontal movement of said heads, a second cam on said shaft, linkage operated thereby for controlling the vertical movement of said heads and means controlled by the excessive leakage current through a defective sheet being tested to move one of said heads away from the other for advancing the defective sheet through a distance greater than that through which a satisfactory sheet is moved, a third cam on said cam shaft, a source of vacuum connected to said heads and a valve under control of said third cam to apply the suction for the pick-up action and to vent the suction heads to effect release at the end of their respective movements.

20. In a sheet dielectric classifying machine, a tractor frame, a selector carriage under control thereof, said tractor frame having an axle therein, a disk keyed thereto, a drag-link pivoted to near the periphery of said disk at one end to said selector carriage at the other, a gear freely rotatable upon said axle, a fixed rack meshing therewith, a pawl having a pivot rigid with said disk, and means controlled by a characteristic of a sheet departing from normal to bring said pawl into active operation for positive drive of said disk from said gear to advance the selector carriage by the resultant advance of the drag-link.

21. In an apparatus of the character described, a tractor device comprising a frame, an axle therein, a drum keyed to said axle, a disk keyed to said axle, a gear freely rotatable upon said axle, a fixed rack meshing with said gear, a ratchet wheel rigid with said gear, a pawl pivoted to said drum, a tension reel carried by said frame, a strap connecting said reel to said drum, a testing circuit and means under control of test leakage current through a sheet that is below specifications, to cause the pawl to engage the ratchet and thereby to drive the disk and the drum under the impulse of the gear rolling on the rack in the advance movement of the tractor frame.

22. In a machine for automatically segregating dielectric sheets below specifications, the combination of a source of sheets to be tested, a collector magazine for those that meet specifications, a testing block, means for delivering sheets in succession to the testing block, a selector carriage for transporting the tested sheets, and an auxiliary transmission for imparting an added motion to the selector carriage where the sheet transported thereby is below specifications, said transmission being responsive to excess leakage current through a sheet on the testing block.

23. The combination recited in claim 22 in which a relay is provided responding to such excess leakage current, said auxiliary transmission is under control of said relay, and means effective to return the selector carriage to initial position, after the completion of said added motion thereof.

24. In an automatic machine for selecting dielectric sheets that are up to specification and discarding those below specification, the combination of a source of supply for the sheets, a testing block, means for electrically testing sheets in sequence upon said block, and a collector magazine for the sheets that are up to specification, means including a selector head coacting with said testing block and adapted to transport the successively tested sheets selectively to the collector magazine as to those that are up to specifications and beyond the collector magazine as to those that are below specifications, the combination of a slide rail structure, means for imparting a uniform reciprocatory stroke thereto, a tractor frame affixed to said slide rail structure, a selector frame carrying said selector head and slidable upon said slide rail structure, a relay responding on test to the high leakage current through a defective sheet, a normally inoperative transmission in said tractor frame, means under control of said relay to render said transmission operative for imparting a tractive impulse to the tractor frame, for corresponding sliding advance of said selector frame along the slide rail for the reject action, as the slide rail is shifted with the tractor frame, means under control of said slide rail at the conclusion of its movement for interrupting said relay circuit, and means resiliently to take up lost motion during the operation of said tractor transmission.

25. In an automatic sheet dielectric classifying machine, the combination of alternating current power mains, a testing block, means for feeding sheets successively to said block, means for closing the circuit through a sheet on said block, including a timer, a relay in said circuit ineffective under the small leakage through a sheet up to specification but operative under the higher leakage through a defective sheet, a primary transmission to transport to a collector a sheet up to specifications, an auxiliary transmission under control of said relay to transport through an additional path and beyond said collector a sheet below specification, said means including an operating relay closed by said test relay, means connecting said operating relay directly to the power mains independently of the reopening of said test relay, and a switch under the operation of one of said transmissions to interrupt said operating relay circuit at the conclusion of the auxiliary transmitting operation, thereby to permit return of the parts to normal position.

26. In an automatic sheet dielectric classifying machine, the combination of alternating current mains, a high voltage transformer operated from said mains, a high voltage sheet testing circuit across the secondary of said transformer, means including a timer for momentarily applying the testing impulse in said sheet testing circuit, a test relay in said high voltage circuit responsive to the greater leakage current through a defective sheet, an operating relay in circuit with said test relay, a holding relay in parallel therewith, said operating and said holding relays being connected directly across said power mains to maintain their circuit regardless of the reopening of said test relay, a primary transmission for transporting a tested sheet to selected position, an auxiliary transmission under control of said operating relay for imparting an additional displacement to the sheet carried by said primary transmission when the test shows a defect therein, and a switch in the circuit of said operating and holding relays under control of one of said transmissions to open circuit at the conclusion of the auxiliary transmission action.

27. In an automatic sheet classifying machine, the combination of power mains, a driving motor for the machine operated therefrom, supply and collector magazines for the sheets being classified, each having a follower therein, and a primary transmission for delivering tested sheets to the collector magazine, a high voltage testing circuit operated from said mains, including timer means for momentarily closing circuit to a sheet being tested, said circuit also including a test relay responsive to the high leakage through a defective sheet, an operating relay actuated by the operation of said test relay, means for actuating said operating relay from the mains after opening of the test relay circuit, auxiliary transmission means under control of said operating relay for moving such defective sheet through an additional displacement to discard position, a switch in said operating relay circuit, means under control of the said primary transmission for opening said switch at the conclusion of the operation of the auxiliary transmission, a low-voltage transformer connected to the mains, and means under control of the magazine followers to close the low-voltage circuit when a magazine requires replacing, and a relay under control of the circuit thus closed to interrupt the main circuit, said relay being of the type requiring manual actuation for restarting the machine.

28. In an automatic sheet dielectric classifying machine, the combination of a bed, a supply magazine having a follower thereon, a testing block and a collector magazine rising therefrom, a horizontal slide rail, a pick-up carriage affixed thereon and having a vertically slidable pick-up head mounted therein, normally in registry with the supply magazine, a selector carriage slidable on said rail and having a vertically slidable selector head mounted therein normally in registry with said testing block, means for effecting a vertical movement of said heads, means for effecting a fixed horizontal movement of said slide rail, means for applying suction to said heads in their pick-up action and releasing the suction in the deposit action, means for applying a testing impulse to a sheet on the testing block, spring means for urging the follower stack in the supply magazine upward during the pick-up action and means for normally braking the spring impelled movement of said follower, a single cam shaft for controlling all of said operations, said cam shaft having an elevator cam thereon for controlling the up and down movement of the heads, a transfer cam for controlling the back and forward movement of the slide rail, a pneumatic control cam for applying and releasing the suction for the pick-up and deposit actions respectively, and means under control of one of said cams for momentarily releasing the brake in correctly timed relationship to permit spring-lifting of the follower in the supply magazine, said means comprising an enlargement on one of said cams and a brake release lever under control of said enlargement.

29. The combination recited in claim 28 in which an electric timer is mounted on said cam shaft for applying the testing impulse by closing the testing circuit in correct phase relation with the operation set forth.

30. An automatic machine for selecting dielectric sheets, including means for subjecting such sheets successively to electrical test, means for transferring the sheets that test normal, through a uniform distance, and means responsive to a deficiency in the test of a sheet to increase the speed and thereby lengthen the distance of said transfer.

31. In a machine for classifying dielectric sheets and of the type that comprises an electrical testing block, a supply magazine, means for picking up sheets successively from the top of said magazine and transferring them successively to the testing block, means for applying electrical testing impulse to the sheet on the testing block, a plurality of collector magazines, and selective means responsive to the current leakage through the tested sheet, selectively to transfer the sheets in accordance with their grading to the corresponding collector magazine; the combination in which the testing block comprises an insulating hollow standard, a conducting rod therein, a platform in the upper end of said standard for supporting the sheet to be tested and a spring interposed between said rod and said platform to permit the latter resiliently to take the thrust of a circuit closing head when pressed against said platform.

32. The combination recited in claim 31 in which an air blower nozzle feeds into said standard immediately below said perforated platform.

FRANK R. SCHMITT.

REFERENCES CITED

The following references are of record in the file of this patent:

UNITED STATES PATENTS

| Number | Name | Date |
|---|---|---|
| 1,984,031 | Purdy | Dec. 11, 1934 |
| 380,774 | Stevens | Apr. 10, 1888 |
| 794,146 | Ericson | July 4, 1905 |
| 2,059,254 | Lasker | Nov. 3, 1936 |
| 2,016,455 | Purdy | Oct. 8, 1935 |
| 1,835,382 | Cunningham | Dec. 8, 1931 |
| 1,763,067 | Schaaff | June 10, 1930 |
| 2,024,583 | Kurth | Dec. 17, 1935 |
| 1,219,426 | Beckmann | Mar. 20, 1917 |
| 1,237,646 | Hollerith | Aug. 21, 1917 |